(12) United States Patent
Lenoir et al.

(10) Patent No.: US 6,671,806 B2
(45) Date of Patent: Dec. 30, 2003

(54) WATERMARK DETECTOR

(75) Inventors: Petrus Johannes Lenoir, Eindhoven (NL); Johan Cornelis Talstra, Eindhoven (NL); Johan Paul Marie Gerard Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 219 days.

(21) Appl. No.: 09/881,605

(22) Filed: Jun. 14, 2001

(65) Prior Publication Data

US 2002/0049569 A1 Apr. 25, 2002

(30) Foreign Application Priority Data

Jun. 16, 2000 (EP) ............................................. 00202094

(51) Int. Cl.[7] ............................. G06F 12/14; H04L 9/00
(52) U.S. Cl. ...................................... 713/193; 713/176
(58) Field of Search ................................. 380/201, 203, 380/205, 234, 241; 713/176, 193, 189; 705/57

(56) References Cited

U.S. PATENT DOCUMENTS

| | | | |
|---|---|---|---|
| 5,933,798 A | | 8/1999 | Linnartz ....................... 702/191 |
| 6,061,449 A | * | 5/2000 | Candelore et al. ............. 380/28 |

FOREIGN PATENT DOCUMENTS

EP          0908810 A2    4/1999    ............. G06F/1/00

* cited by examiner

*Primary Examiner*—Matthew Smithers
(74) *Attorney, Agent, or Firm*—Michael E. Belk

(57) ABSTRACT

The invention relates to a method of outsourcing intermediate results of an internal data processing to an external memory, to a corresponding device for processing data having an interface for outsourcing intermediate results, to a disk drive having a corresponding device for processing data, and a cellular phone having a device for processing data. This method can be applied when confidential data is processed but intermediate results thereof need to be stored externally to the processing. First intermediate result data units (I1) are combined with first verification data units (V1) in order to provide a data signal (S1), which is encrypted (E1) and stored in an external memory (5). When the intermediate result data units (I1) stored in the external memory (5) are needed during a subsequent internal data processing a data signal (E2) is read from the external memory (5). After the decryption of the read data signal second verification data units (V2) and second intermediate result data units (I2) are obtained. Said second read verification data units (V2) are verified with said first verification data units (V1) in order to detect any manipulation of the intermediate result data during the time that they were stored in the external memory (5).

16 Claims, 4 Drawing Sheets

WATERMARK DETECTOR

Figure 1:
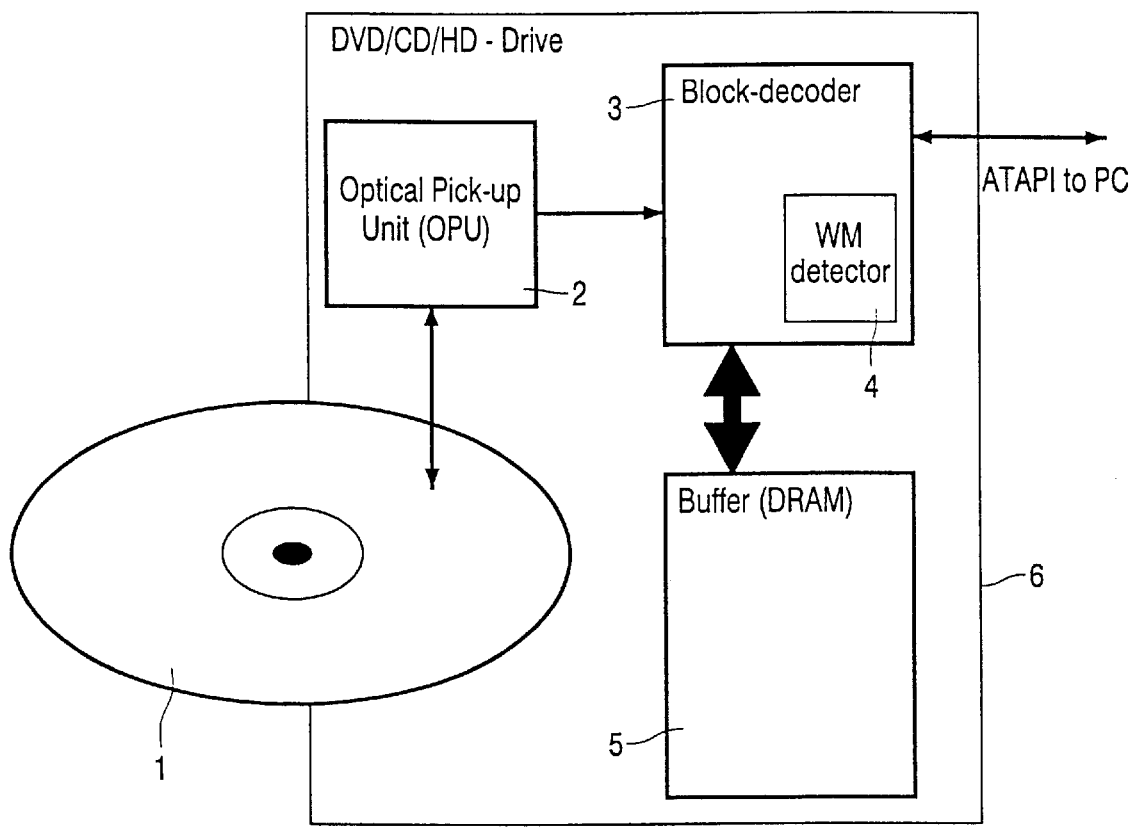

The present invention relates to a method of outsourcing intermediate results of an internal data processing to an external memory, a device for processing data having an interface for outsourcing intermediate results of an internal data processing, a disk drive having a corresponding device for processing data and a cellular phone having a device for processing data.

The emergence of digital video delivered through DVD or HDTV and other distribution media is now beginning to make a new and improved picture quality available to consumers. But on the other hand it poses new threats to copyright owners through the imminent availability of recordable DVD's, DVHS and multimedia personal computers. By using these new products ordinary consumers could easily make high quality unauthorized copies of copyrighted data.

One approach to protect copyright content is to embed a watermark into multimedia content such as audio, slow images, animation or video, wherein these watermarks are imperceptible to the human eye. Detectors can be cost effectively deployed in hardware or software to meet real-time play and record control requirements in a wide range of platforms like DVD. With an efficient detector implementation and robust watermark encoding the watermark can survive a wide variety of professional and consumer analog-to-digital and digital-to-analog transformations and video processing.

When reading the multimedia content with an embedded watermark the watermark needs to be detected and processed to determine the copyright status of the multimedia content. During the watermark detection processing several intermediate results of different processing steps are stored or buffered until the respective data is needed in a subsequent processing step. Hence a conventional watermark detector must comprise some kind of memory. The complexity of a watermark detector is increasingly dominated by the RAM necessary to do its computations. A watermark detector is for example known from U.S. Pat. No. 5,933,798.

The costs of such a watermark detector could be lowered proportionally if memory space already available in a player and recorder system in which the watermark detector is implemented, could be used to temporally store intermediate results of the data processing. For example, a MPEG decoder has 2–4 MBytes of RAM for PC-buffering and image reconstruction.

The bandwidth on a data bus to a buffer memory is also critical. There is already frequent access on the bus between the original hardware in for example a DVD-player and the external memory. The advantage of watermark detection is that it can be done in the background. A watermark detection delayed by 200 msec does not decrease the effectiveness of watermarks as copy-control measures.

Two main problem areas, namely the integrity and the confidentiality problem, are observed when watermark detectors share memory resources:
Integrity problem: The external RAM is reasonably easy to access, and a hacker wanting to obstruct the watermark detection function could replace the data stored by the detector through zeroes or dummy data before it is retrieved again by that detector.
Confidentiality problem: Furthermore a hacker could glean information about the precise shape of the watermark by studying the data stored in the external memory.

Accordingly, it is an object of the present invention to improve the security of outsourcing of intermediate results during a watermark detection processing. Further, a corresponding device for processing data having an interface for outsourcing intermediate results, a disk drive having a corresponding device for processing data, and a cellular phone having a device for processing data shall be provided.

These objects are achieved according to the invention by a method as set forth in claim 1, by a device for processing data having an interface for outsourcing intermediate results as set forth in claim 13, by a disk drive having a corresponding device for processing data as set forth in claim 16, and a cellular phone having a device for processing data as set forth in claim 17.

The invention is based on the recognition that the outsourcing of intermediate results of an internal data processing to an external memory is done by providing a first data signal constituted by first verification data and first intermediate result data. The first data signal is encrypted and stored or buffered temporarily in the external memory. When the internal data processing needs the stored intermediate results a respective data signal is read from the external memory. This read data signal is decrypted resulting in second intermediate result data and second verification data. Finally, the second verification data are authenticated with said first verification data. Through this authentication it can be made sure that the intermediate result data have not been manipulated while they were stored in the external memory or while they were transferred to and from the external memory. The present invention allows a secure "borrowing" of an external memory which is used as scratchpad memory.

In a further aspect of the invention the step of encrypting is being done using a key which is generated in a random number generator. Said key can be generated every time when intermediate result data units are to be outsourced to an external memory. This means that the key is locally generated, is only used once and becomes invalid after use, so that it becomes impossible to manipulate the key or to learn anything about the key from the outsourcing of data. The key can alternatively be fixed instead of being generated regularly or during each step of encryption.

In a still further aspect of the invention a check is made to see if the first and second verification data units correspond to each other by comparing them in the verification step.

The verification data units can be calculated internally according to an algorithm. The same algorithm can be used for generating the first and second verification data units. Preferably this algorithm shall be kept secret.

In a preferred aspect of the invention the verification data units are address data units. The first address data units preferably correspond to the r least significant bits of addresses of the external memory at which the intermediate result data units are stored in the step of storing. Moreover, in the step of verification the actual addresses of the intermediate result data units in the external memory are compared to the second address data units which are read out of the external memory and which correspond to the first address data units if the content of the external memory has not been manipulated. Alternatively functions of the address data can be used as verification data. The usage of address data as verification data has the advantage that no specific verification calculation of the data needs to be carried out since the address data is readily available.

In a further preferred aspect of the invention the external memory is a m-bit memory, the length of the intermediate result data units is n-bits and the length of the address data units is r-bits with m being a multiple of eight and n not necessarily being a multiple of eight. The usage of this structure allows to fully exhaust an external memory which is usually a 8-, 16-, 32-, 64-bit, 128-bit, ... memory. Since the length of the n-bit intermediate result data units is usually not a multiple of eight they are filled up with r-bit address data units so that the sum of the length of the intermediate result data units and the length of the address data units is a multiple of eight, in order to allow additional redundant information to be incorporated into the information signal.

In a further aspect of the invention intermediate results of a watermark detection processing are outsourced to an external memory.

In a further aspect of the invention intermediate results of a watermark detection processing in an optical disk drive, a SDMI-player, or a MPEG decoder are outsourced to an external memory of the respective device.

In a further aspect of the invention intermediate results of an internal data processing in a cellular phone are outsourced to an external memory of the cellular phone.

In a further aspect of the invention a device for processing data having an interface for outsourcing intermediate results of an internal data processing to an external memory comprises combining means for providing a first data signal constituted by first verification data and first intermediate result data, encrypting means for encrypting the first data signal, storing means for storing or buffering temporarily the first data signal in the external memory, reading means for reading a data signal from the external memory, when the internal data processing needs the stored intermediate results, decrypting means for decrypting the read data signal resulting in second intermediate result data and second verification data, and verification means for verifying the second verification data with said first verification data.

In a still further preferred aspect of the invention the device for processing data having an interface for outsourcing intermediate results is a watermark detector and intermediate results are outsourced to an external memory.

In a further aspect of the invention the watermark detector is implemented in an optical disk drive, a SDMI-player or a MPEG decoder.

In a further aspect of the invention a disk drive comprises a device for processing data having an interface for outsourcing intermediate results of an internal data processing to an external memory.

In a further aspect of the invention a cellular phone comprises a device for processing data having an interface for outsourcing intermediate results of an internal data processing to an external memory.

Other preferred embodiments of the invention are disclosed in the dependent claims.

Figure 2:
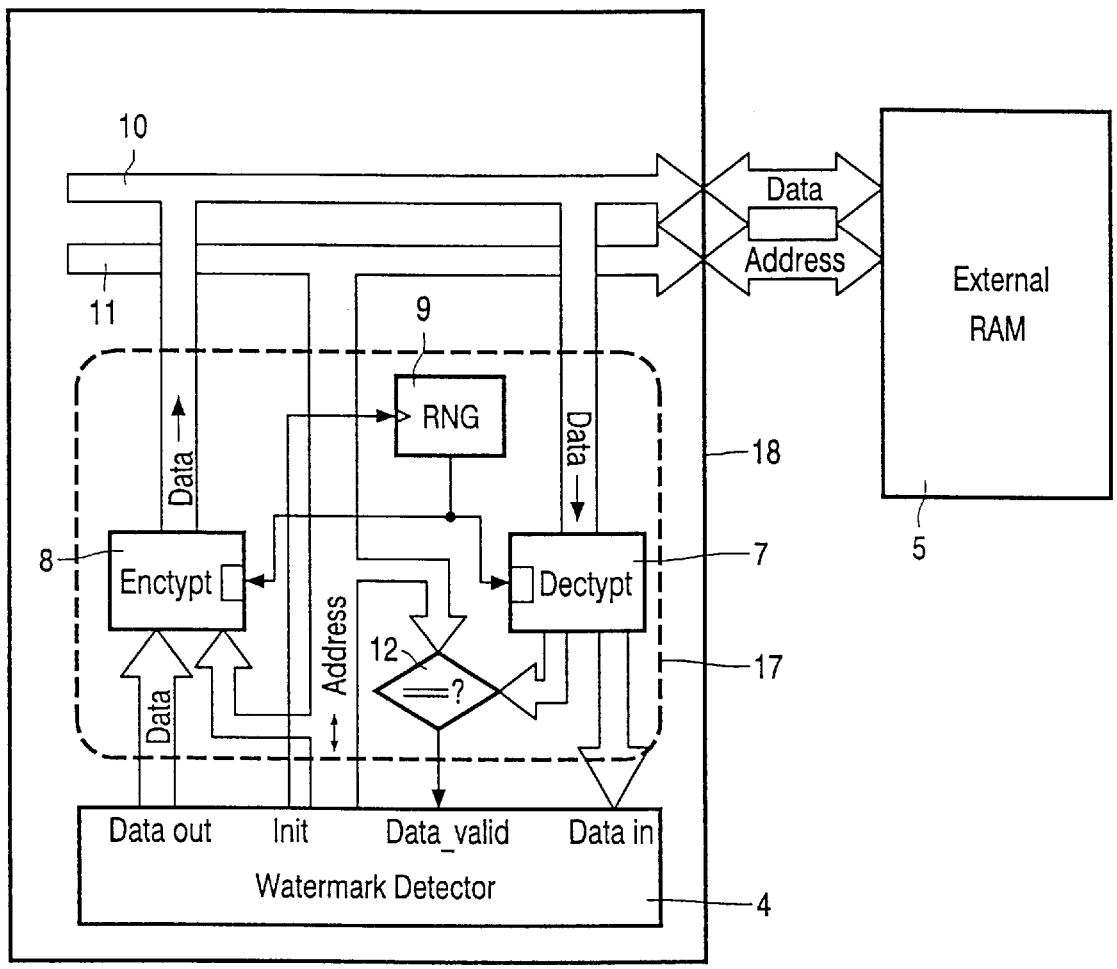
Figure 3:
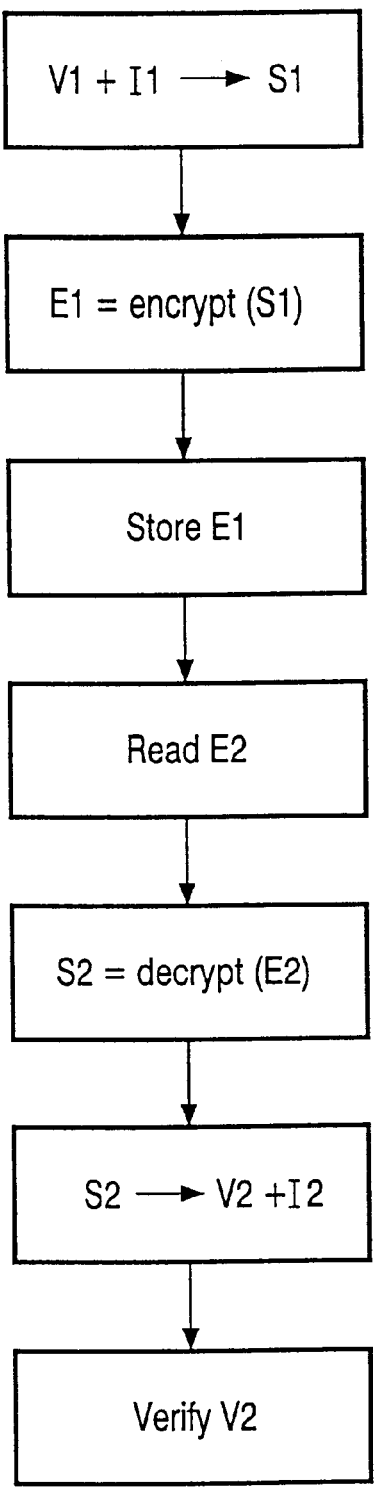
Figure 4:
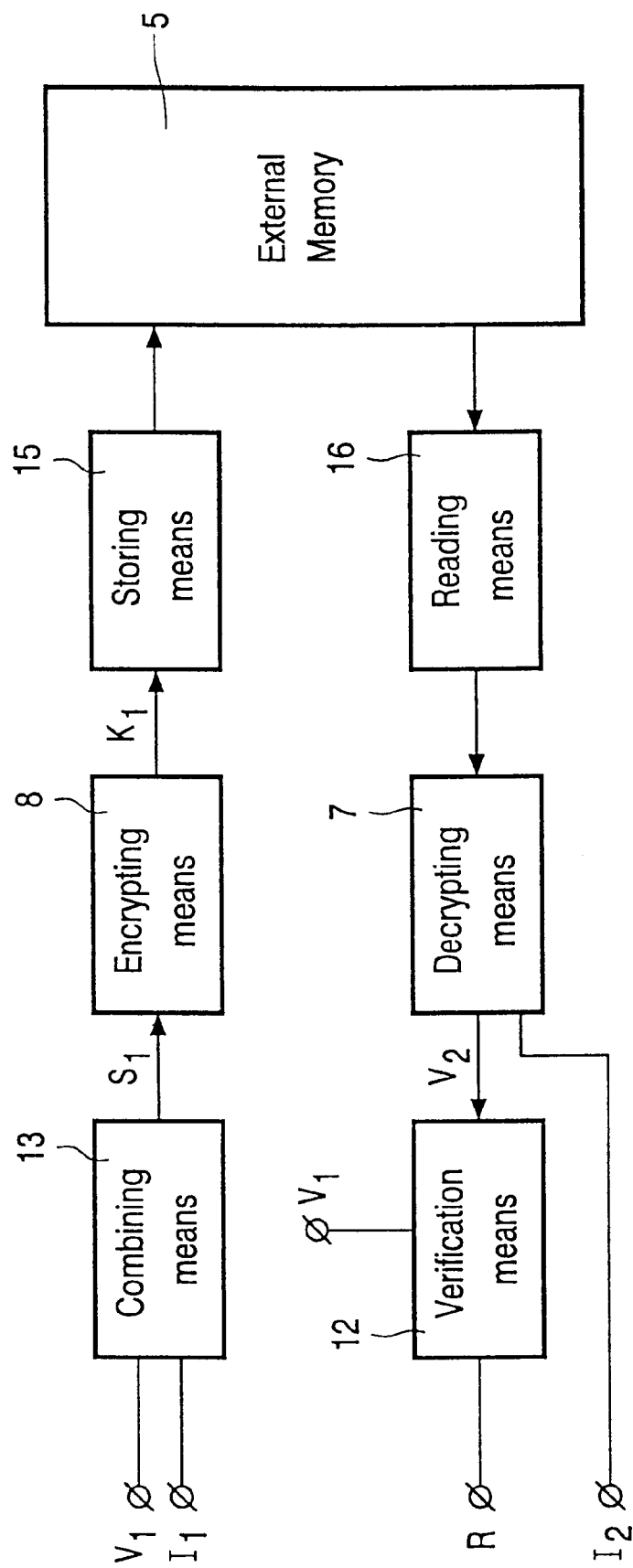

The invention and preferred embodiments thereof are explained hereinafter in more detail with reference to the following drawings in which FIG. 1 shows an optical disk drive according to a first embodiment, FIG. 2 shows the architecture of storing intermediate results from a watermark detector in an external memory according to the first embodiment, FIG. 3 shows a flow chart of the method according to the invention, and FIG. 4 shows a simplified block diagram of the device according to the invention.

FIG. 1 shows a schematic diagram of an optical disk drive 6. A disk like a DVD or a CD is used as an optical recording medium 1. An optical pick-up unit (OPU) 2 controls a laser and detects the reflection of the disk. The intensity of this reflection is turned into a bitstream. A block decoder 3 error-corrects these bits and orders the result in a buffer memory 5 into logical blocks that can be read for example by a PC. The buffer memory 5 is referred to as "external RAM" or external memory in this disclosure. A watermark detector 4 would typically be integrated with the block decoder 3. The watermark detector 4 typically collects some video or audio material in the buffer 5, performs some signal processing on this buffer 5, correlates the contents of the buffer 5 with a watermark and performs some further signal processing. The usage of the buffer 5 makes the system vulnerable to attacks by a hacker. The hacker could try to destroy or manipulate the intermediate results stored in the buffer 5 in a way that it is advantageous to him. Furthermore the correlation of the content of the buffer 5 with a watermark is also very sensitive to attacks in which a hacker wants to learn any information from the intermediate results in order to gather information about the watermark, since after the correlation some information about the watermark is contained in the buffer 5.

In general a watermark detector can be implemented in an optical drive, a MPEG video card, an audio decoder card, a SDMI-Player, a HD-drive or the like.

E.g. when used in a DVD drive reading video data from a disk, the watermark detector 4 typically collects data from every frame of a video sequence and accumulates these in a tile of size 128 by 128 pixels. The image (720×480 pixels per frame) is folded into a tile of 128 by 128 pixels per frame, i.e. about 5×3,75 times. This process takes about one second of video sequences, i.e. for about 25 to 30 frames. A FFT is performed on this tile. The tile content is multiplied after FFT by a secret watermark pattern, and then an I-FFT is performed. Then two peak values are searched for in the tile. This tile is a main piece of data that needs to be stored temporally in the RAM 5. Thus the data is stored in the RAM 5 for about one second but there are about 500 to 600 additions performed on each entry during this one second. Then the FFT, the multiplication and the IFFT are executed on the RAM data. After the peak search the memory is cleared, i.e. reset to zero.

An external RAM 5 is usually made of m-bits words, where m is a multiple of 8. In contrast to that the intermediate result data I1 to be stored in the external m-bit RAM 5 is usually constituted by n-bit words, where n is generally not a multiple of 8. This leads to a potential inefficient way of storing intermediate result data I in the external RAM 5. If r is zero, because n happens to be a multiple of 8, spare bits can be artificially created by arbitrarily setting r to 8.

There are r redundant bits for every n-bit word of watermark data stored in a m-bit RAM 5. These r-bits can be used to improve the security of the outsourcing of data to the external RAM 5. As an example n equals 18 and m equals 8. This means that three 8-bit data words are needed to store one 18-bit intermediate result data word I1, resulting in 6 spare bits per watermark word. During the outsourcing of intermediate result data words I to the external RAM 5 the watermark decoder 4 fills the extra r-bits with additional information. This allows to verify during read-back, whether the data has been manipulated while it was stored in the external RAM 5 or during the communication with the external RAM 5.

FIG. 2 shows the architecture of the outsourcing of intermediate results from the watermark detector 4 to an external RAM 5. The area 17 inside the dash box contains all the hardware added for handling the security of the outsourcing of the data. The watermark detector 4 is usually inside an IC package 18 that has no or little RAM 5. RNG is a random number generator 9, which is clocked by the watermark detector 4.

At the beginning of a watermark detection processing the watermark detector 4 clocks the random number generator 9 to yield a random key Kn. If the watermark detector 4 wants to store a n-bit intermediate result data word I1 in the m-bit external RAM 5 at an address A, the r least significant bits of address A are padded as address data to the n-bit intermediate result data word I in order to give an m-bit data signal S1. The m-bit data signal is encrypted in the encryptor 8 with a key Kn. The encrypted data signal E1 is stored in the external RAM 5 with a starting address at address A.

When the intermediate result data I1 stored in the external RAM 5 is needed during the watermark detection processing the respective intermediate result data is read from the external RAM 5. The read m-bit data signal is sent to a decryptor 7 in order to be decrypted with key Kn. After decrypting the read data signal n-bit intermediate result data words I2 and r-bit address data words V2 are obtained. It must now be verified that the read and decrypted intermediate result data words I2 correspond to the initial intermediate result data words I1. This verification is being done by comparing the read and decrypted r-bit address data words V2 with the address data of the actual address of the intermediate result data word as read from the external RAM 5. If these data correspond to each other, the data as read from the external RAM 5 correspond to the data as stored previously into the external RAM 5, i.e. the data has not been manipulated with and can hence be used in further watermark detection processing. The caret-symbol 12 in FIG. 2 represents the verification operation, i.e. the test if the least significant bits from an address bus 11 and the least significant bits V2 of the decryptor 7 are equal. If they are not equal an alarm flag is sent to the Data_valid input of the watermark detector 4. The data input and output (Data in and Data out) of the watermark detector 4 can be multiplexed together, so the encryptor 8 and the decryptor 9 can be a single device.

If a hacker changes some of the memory cells in the external RAM 5 not only will different data be read-back after the decryption but also the address data in the spare bits (r-bits address data) V2 will have changed along, since the intermediate result data I1 and the address data V1 are effectively mixed during encryption. With a sufficiently secure encryption algorithm it is infeasible for hacker to guess how to change the memory cells without changing the address.

A major advantage of this method is that there are no global secrets like keys which have to be put in in a factory. Instead the keys are generated locally, i.e. in the RNG 9, and do not leave the IC package and expire after being used once.

In order to prevent replay attacks it is important to use a new key from the RNG 9 for every outsourcing operation. In replay attacks valid intermediate result data I from one calculation may be used to spoil the results of a subsequent calculation if the same key is used. According to the invention frequently changing the key does not impose an extra overhead, since the key is generated and used locally.

Additionally the method according to the invention catches shuffling attacks. In a shuffling attack the attacker moves bytes around in the external RAM 5 but here the addresses will not match any longer.

As a possible optimisation Kn can be fixed at the manufacturing time but otherwise be completely random and even different for every IC to make key scheduling cheaper. To further prevent replay attacks the address is EXORed with a random number Rn taken from the RNG 9. Rn is also changed before every subsequent calculation. The check at read-back is then once more EXORed with Rn. The result is compared with the r least significant bits of address A. Alternatively the key is not generated by the RNG 9, but is fixed during processing. This is not optimal from the security point of view but may decrease production cost.

As encryption/decryption algorithm e.g. "3-Way" can be used, which is a highly regarded algorithm. The encryption/decryption method is a block-cipher which operates with 96 bits data block and 96 bit keys. 40 bits in the key may be dropped to avoid export problems. 3-Way has a round function which is recommended to be iterated 11 times. This round function is cheap in both hard- and software.

Alternatively a simple r-bit function of the address A can be used as address data instead of using the r least significant bits of address A.

The method of outsourcing intermediate results of an internal data processing can be for example applied to a mobile phone, MPEG decoders, a DVD audio decoder, a SDMI-player or the like.

The second embodiment is not limited to a watermark detector. Other general security devices may use the method of outsourcing intermediate result data whereever confidential data is processed but needs to store intermediate results externally to it for example because no memory resides on the particular processing chip. This can be for example a mobile phone, MPEG decoders, a DVD audio decoder, a SDMI-player or the like. In mobile phones or the like the method of outsourcing intermediate results can be used during public key computation like for signature verification or the like.

FIG. 3 shows a flow chart of an outsourcing method and FIG. 4 a simplified block diagram of a data processing device according to the flow chart of FIG. 3. Intermediate result data I1 is combined with verification data V1 using a combining means 13 in order to form a data signal S1. The data signal S1 is encrypted E1 by an encrypting means 8 and then stored in the external memory 5 by a storing means 15. On request of the internal data processing the stored data signal E2 is read-out by a reading means 16 and is decrypted by a decrypting means 7. After the decryption second intermediate result data 12 and second verification data V2 is yielded. Finally the second verification data V2 is verified with the first verification data V1.

According to an alternative embodiment of the present invention the verification data can be generated using an algorithm. The algorithm can be applied to the intermediate result data or to a part of these data, wherein the data generated by the algorithm are used as verification data. Obviously this algorithm needs to be stored in a decoder which is requesting the outsourcing of the intermediate result data. Preferably this algorithm shall be kept secret. When the outsourced intermediate result data is read from the external RAM 5 it is decrypted resulting in intermediate result data 12 and verification data V2. The algorithm is applied both to the read and the decrypted intermediate result data, and the output of this operation is compared to the verification data V2 read and decrypted from the external RAM 5.

It shall be understood that the method of outsourcing intermediate results, the device for processing data having an interface for outsourcing intermediate results, the disk drive having a corresponding device for data processing, and a cellular phone having a corresponding device for processing data as set forth in the claims can be developed further in the same or a corresponding way as described above and as set forth in the subclaims with reference to the method of outsourcing intermediate results.

In particular, the method according to the invention is not limited to outsourcing intermediate results which are related to a watermark detection process, but can be used for outsourcing all kinds of intermediate results relating to internal data processing.

What is claimed is:

1. Method of outsourcing intermediate results of an internal data processing to an external memory, comprising the steps of:
    a) combining first verification data units with first intermediate result data units to provide a first data signal;
    b) encrypting said first data signal;
    c) storing said encrypted first data signal in the external memory;
    d) reading a data signal from said external memory on request of said internal data processing;
    e) decrypting the read data signal yielding second intermediate result data units and second verification data units; and
    f) verifying said second verification data units with said first verification data units wherein said first and second verification data units are address data units.

2. Method according to claim 1, wherein said first data signal is encrypted using a key generated in a random number generator.

3. Method according to claim 2, wherein a new key is generated every time intermediate result data units are stored in the external memory.

4. Method according to claim 1, wherein said first and second verification data units are compared in step f) to check if they correspond to each other.

5. Method according to claim 1, wherein said first verification data units are generated using an algorithm.

6. Method according to claim 1, wherein the first addressed data units corresponds to the r least significant bits of addresses at which the intermediate result data units are stored in step c).

7. Method according to claim 1, wherein the step f) said second verification data units are compared with the r least significant bits of addresses at which the second intermediate result data units are read out of external memory.

8. Method according to claim 1, wherein the length of the external memory is in-bits with m being a multiple of 8, the length of the intermediate result data units is n-bits with n not being a multiple of 8, and the length of one verification data unit is r-bits.

9. Method according to claim 1, wherein intermediate results of a watermark detection processing are outsourced to an external memory.

10. Method according to claim 9, wherein intermediate results of a watermark detection processing in an optical disk drive, a SDMI-player or a MPEG decoder are outsourced to an external memory of the respective device.

11. Method according to claim 1, wherein intermediate results of the internal data processing in a cellular phone are outsourced to and external memory of the cellular phone.

12. Device for processing data having an interface for outsourcing intermediate results of an internal data processing to an external memory, comprising:
    a) combining means for combining first verification data units with first intermediate result data units to provide a first data signal;
    b) encrypting means for encrypting said first data signal;
    c) storing means for storing said encrypted first data signal in the external memory;
    d) reading means for reading a data signal from said external memory on request of said internal data processing;
    e) decrypting means for decrypting the read data signal yielding second intermediate result data units and second verification data units; and
    f) verifying means for verifying said second verification data units with said first verification data units wherein said first and second verification data units are address data units.

13. Device according to claim 12, wherein the device is a watermark detector and wherein intermediate results are outsourced to an external memory.

14. Device according to claim 13, wherein the device is a watermark detector in an optical disk drive, a SDMI-player or a MPEG decoder and wherein intermediate results are outsourced to an external memory of the respective device.

15. Disk drive having a device according to claim 12.

16. Cellular phone having a device according to claim 12.

* * * * *